United States Patent [19]

Lostak et al.

[11] 4,354,891
[45] Oct. 19, 1982

[54] METHOD OF CURING POLYESTER RESIN IN THE PRESENCE OF RUBBER

[75] Inventors: Charles Lostak; John L. Sznopek, both of Littleton; Manfred Klepetar, Denver, all of Colo.

[73] Assignee: Manville Service Corporation, Denver, Colo.

[21] Appl. No.: 910,920

[22] Filed: May 30, 1978

[51] Int. Cl.³ .................... B29H 9/10; B32B 25/08
[52] U.S. Cl. .......................... 156/307.3; 427/302; 427/322
[58] Field of Search ............... 427/302, 322, 385 B; 428/480, 483; 156/60, 307.3

[56] References Cited

U.S. PATENT DOCUMENTS 3,857,730 12/1974 Kalafus et al. ............ 427/385 B X
3,902,950  9/1975 Tung et al. .................. 428/480 X
3,968,304  7/1976 Wise ........................... 428/480 X Primary Examiner—James R. Hoffman
Attorney, Agent, or Firm—Gregory W. O'Connor

[57] ABSTRACT

A method is described for achieving full cure of a peroxide cured polyester resin in the presence of rubber, which method is based on the discovery that there is competition between the uncured resin and the rubber surface for the peroxide curing agent present adjacent to the rubber/resin interface. The method has several embodiments, including: (1) utilizing a low surface activity rubber, (2) deactivating the surface of a high surface activity rubber, (3) utilizing a peroxide material at the interface, (4) utilizing a material with which the rubber surface reacts preferentially, and (5) utilizing a "rapid cure" for the polyester. Also described is a laminate of rubber and polyester resin formed by this method.

6 Claims, 1 Drawing Figure

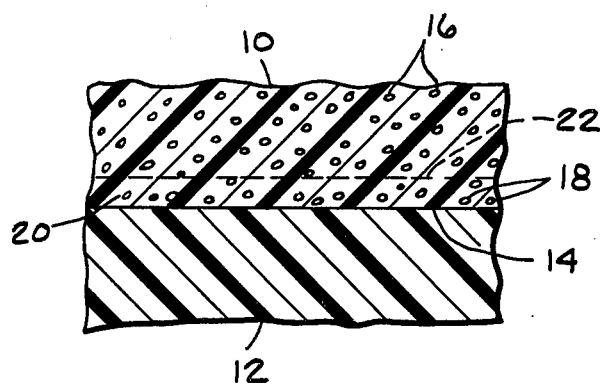

METHOD OF CURING POLYESTER RESIN IN THE PRESENCE OF RUBBER

BACKGROUND OF THE INVENTION

The invention herein relates to a method of achieving full cure of a peroxide cured polyester resin. More particularly it relates to a method of effecting such curing in the presence of rubber.

In the manufacture of peroxide cured polyester resin articles it is often necessary to effect the curing of the resin in the immediate presence of rubber surfaces. A notable example of this situation occurs in the manufacture of fiber reinforced polyester pipe couplings which are to be cured while simultaneously molding a rubber gasket into the pipe wall. In the past this has been beset with significant difficulties, for it is commonly found that the polyester resin will not fully cure in the presence of the rubber, and the resin remains tacky in the area of the rubber/resin interface. The insufficient curing thus leaves the resin article badly weakened in the area of the interface and also prevents the rubber body from being properly retained by and/or adhered to the resin body. In the aforesaid pipe coupling, for example, such insufficient curing of the resin creates a weakened area in the pipe coupling wall and also prevents the rubber gasket from being satisfactorily retained within the structure, particularly when forces are exerted against the rubber gasket during joining of adjacent lengths of pipe in the field using such couplings. In addition, the uncured resin itself acts as a lubricant and allows the rubber gasket to be easily pulled out of the coupling.

In the past there have been attempts to devise elaborate mechanical structures to aid in retention of the rubber in position adjacent to the resin body. Gaskets have been designed, for instance, with elaborately ridged, dovetailed or otherwise configured external surfaces in attempts to form a mechanical interlock with the resin body after curing. Because the problem of incomplete cure is not dealt with directly, however, these mechanical expediences have been of only limited effectiveness. In addition, the complex structures have significantly raised the cost of the rubber articles (such as gaskets) because of the complicated rubber molding techniques required to form the complex surface configurations.

It would therefore be highly desirable to have a method for fully curing polyester resin in the presence of rubber, such that rubber bodies may be satisfactorily molded into and/or adhered to polyester resin bodies.

SUMMARY OF THE INVENTION

The invention herein resides in the discovery of the source of the problem with polyester resin curing in the presence of rubber and also in the process which has been devised to eliminate this problem and allow the polyester resin to cure properly, as well as in the resulting laminated product. The source of the problem has been discovered to be an unfavorable reaction rate differential in which the reaction rate of the polyester cure in the presence of a peroxide curing agent ("initiator") is effectively significantly less than the competing surface reaction rate of the rubber surface at the interface for that portion of the peroxide curing agent which is in the vicinity of the interface. The rubber surface thus removes the curing agent from the interfacial area of the polyester resin faster than the curing agent can initiate the cure of that portion of the polyester resin in the interfacial area, thus leaving the polyester resin only partially cured when the curing agent is exhausted. Having discovered this heretofore unsuspected reaction rate competition, we have devised a method to overcome this problem and promote full curing of the polyester resin in the interfacial area. In its broadest form the method resides in establishing conditions (including temperature, materials and/or pretreatment of materials) to shift the differential between the effective reaction rates such that the effective curing reaction rate for the polyester resin is significantly faster than the effective surface reaction rate of the competing reaction between the peroxide curing agent in the vicinity of the rubber/resin interface and the surface of the rubber at that interface. In one embodiment of the invention establishing such conditions comprises utilizing as the rubber an elastomeric material which has an inherently low rate of surface reaction with the peroxide curing agent. In another embodiment, establishing such conditions comprises utilizing as the rubber an elastomeric material which has been surface treated to reduce its inherent rate of surface reaction with the peroxide curing agent. In yet another embodiment of the invention, establishing such conditions comprises incorporating at the resin/rubber interface a quantity of excess peroxide material (which may or may not be the same peroxide as the curing agent). In yet another embodiment, establishing such conditions comprises incorporating at the resin/rubber interface an effective quantity of a material with which the rubber surface reacts in preference to the peroxide curing agent. In yet another embodiment, establishing such conditions comprises raising the temperature of the system to a point where a "rapid cure" of the polyester resin is completed before too much of the peroxide curing agent is removed by reaction with the rubber surface.

BRIEF DESCRIPTION OF THE DRAWING

The FIGURE of the drawing illustrates schematically a portion of the interfacial area between a polyester body and a rubber body, including a portion of the "interfacial region."

DETAILED DESCRIPTION AND PREFERRED EMBODIMENTS

The discovery and method of this invention can be best understood by referring initially to the FIGURE. This FIGURE depicts schematically portions of a polyester resin body 10 and a rubber body 12 which are in surface contact at interface 14. Dispersed throughout the resin in its uncured state are portions 16 and 18 of a peroxide curing agent. For simplicity in the schematic diagram of the FIGURE, these are shown as discrete units of curing agent dispersed in a resin matrix. However, since the uncured resin and the peroxide curing agent are frequently both liquids, there could also be a homogeneous mixture of the two. For the purposes of this invention, therefore, it is only important that the curing agent be dispersed substantially uniformly throughout the uncured resin body; the exact form of dispersion, whether as discreet units or mixed homogeneously, is not critical.

In the resin body 10 there is an "interfacial region" 20 which is that portion of the resin body lying between line 22 and interface 14. For the purposes of this invention the "interfacial region" is defined as that portion of the resin body which is adjacent to the resin/rubber interface and through which the surface of the rubber exerts a significant reaction effect on the peroxide curing agent. Line 22 represents the distance into the resin body 10 beyond which the reaction effects of the rubber surface are no longer significantly felt by the peroxide curing agent. For clarity of explanation herein those portions of the peroxide curing agent which are outside the interfacial region 20 have been designated 16, while those portions of the peroxide curing agent which are inside the interfacial region 20 have been designated 18. The curing agent is of course the same throughout the resin body 10; the difference between portions 16 and 18 of the peroxide curing agent is that the portion 16 is unaffected by the presence of the rubber and therefore reacts substantially entirely with the uncured resin and effects a full cure of the resin, while portion 18 reacts with both the uncured polyester resin and with the rubber surface. A critical part of the present invention is the discovery that this competition between the uncured resin and the rubber surface for the portion 18 of the curing agent exists and that under prior art conditions the differential between the effective reaction rates favors the rubber surface reaction to the end that full cure of the uncured resin in the interfacial region 20 is prevented. It will be recognized, of course, that there is also a secondary differential effect across the interfacial region 20. The degree of cure of the uncured resin increases as one recedes from interface 14 toward line 22, for the reaction effect of the rubber surface on the portion 18 of the curing agent is strongest immediately adjacent to the interface 14 and diminishes substantially as line 22 is approached. Beyond line 22, as noted, the effect of the rubber surface is negligible and full cure of the polyester resins is accomplished with normal quantities of curing agent 16.

For the purpose of this invention, the term "effective reaction rate" is used to designate the rate at which either the rubber or the uncured resin, respectively, reacts with the curing agent in the present system. The particular numerical value which might be put on such an effective reaction rate under specific conditions of temperature, material type, specific curing agent, and similar parameters of the system is not critical to the present invention. Rather, what is critical is the comparison of the effective reaction rates of the rubber and the uncured resin and the requirement that the method of this invention operates to alter (shift) that differential to one which is significantly more favorable to the effective reaction rate of the uncured resin, in line with the present discovery that the curing problem of the prior art processes has been due to the unfavorable differential which has inherently been present in prior art processes, but has not heretofore been discovered.

The polyester resin of the present invention may be any polyester resin in which curing of the resin is initiated by a peroxide. Descriptions of typical polyester resins, the curing reactions, and the use of peroxide curing agents ("initiators") are widely found in the literature; a typical description is found in Noller, *Chemistry of Organic Compounds* (3d edn., 1965) at page 885.

In this invention any type of rubber, natural or synthetic, can be used. As will be discussed below, in some embodiments of the invention certain types of rubber are preferred because of their inherently low effective surface reaction rate. However, in other embodiments the shift of the differential in effective reaction rate is accomplished by other means such that rubber with inherently high surface reaction rates can be used. Thus the process of this invention allows the rubber component to be chosen on the basis of properties associated with its intended end use rather than necessarily on effective surface reaction rate properties. The various types of rubbers and many of their properties are described in the literature; particularly comprehensive references are the *Vanderbilt Rubber Handbook* (1968) and Stern, *Rubber: Natural and Synthetic* (2d edn., 1967).

The method which has been devised to effectuate the discovery of the present invention has several embodiments. In the first embodiment (and most preferred) the method comprises using normal reaction conditions of polyester resin curing, including conventional temperatures, pressures, curing times and the like, but selecting as the rubber an elastomeric material which has an inherently low surface rate of reaction. Preferred among these materials are peroxide cured ethylene-propylene-diene terpolymers which are frequency referred to by the ASTM designation "EPDM". EDPM rubbers generally are described in the aforementioned *Vanderbilt Rubber Handbook* on pages 76-80. In most instances the surface affinity of the peroxide cured EPDM rubbers for the peroxide curing agents of the polyester resin is inherently sufficiently low that with conventional amounts of curing agent in the uncured resin a complete cure throughout the interfacial region 20 can be accomplished using conventional reaction parameters. It should be noted, however, that many commercial peroxide cured EPDM rubber bodies are formed at least in part by extrusion and/or molding and during the extrusion and/or molding processes they will be coated with extrusion aids, mold release agents and similar materials. Consequently the surface of the EPDM rubber body should be cleaned of these foreign materials before being brought into contact with the uncured resin, since the foreign materials themselves may well have a high degree of affinity for the peroxide curing agent and thus detrimentally affect the polyester cure. This embodiment of the method of the present invention is preferred where the end use for the rubber does not dictate the type of rubber required. Thus for any end use where the type of rubber itself is not critical, it is preferred to use the low surface activity rubbers in the present invention, preferably the peroxide cured EPDM rubbers, because of the simplicity of the present embodiment.

In another embodiment of the invention, the rubber comprises a high surface activity rubber and includes treating the surface of the rubber to reduce that high surface activity to a significantly lower surface activity. Among those rubbers with high surface activity are the many kinds which have been sulfur cured or sulfur vulcanized. It is believed that the high surface activity with relationship to the peroxide curing agent is because of the presence of sulfur at the surface of the rubber. Consequently, the surface treatment should be one that will deactivate or remove the surface sulfur. This particular embodiment is the least preferred of the various embodiments, for it has been found that the choice of materials which will sufficiently lower the surface activity and yet not themselves remain as impurities to affect the resin cure is limited. Some success has been obtained with vigorous washing of the rubber surface with hot water.

In other embodiments the invention comprises incorporating into the system at the interface 14 an excess of peroxide material. Preferably this material will be the same or a similar type of peroxide as the curing agent 18, but it need not be. The reaction of the rubber surface with the excess peroxide leaves sufficient curing agent 18 present to permit complete cure of the interfacial region 20. Particular success has been obtained by utilizing benzoyl peroxide in the form of small crystals spread over the surface of the rubber just prior to placing the resin body in contact with the rubber surface.

In yet another embodiment of the invention the method comprises incorporating at the interface 14 a material with which the rubber surface reacts preferentially as compared to its reaction with the peroxide curing agent. This embodiment is closely related to the embodiment described above in which the surface of the rubber is deactivated. As with that embodiment, this one is not particularly preferred, because once again the number of materials which will adequately function to react preferentially with the rubber and yet will not detrimentally affect the peroxide cure is significantly limited.

All of the above embodiments permit keeping other reaction conditions, including temperature, pressure, reaction time and the like, essentially the same as in prior art curing processes. In another embodiment of the invention, however, a variety of types of rubbers may be used and no particular interface surface treatments are needed (although it may be desirable to wash the surface of the rubber before contacting it with the uncured resin in order to remove any unwanted impurities such as rubber processing aids). In this embodiment of the method, the reaction conditions are altered, preferably by raising the reaction temperature, to accelerate the polyester resin cure. Since it has been observed that the effective rate of the polyester resin cure reaction increases with temperature much faster than the effective rate of reaction of the surface of the rubber and the peroxide curing agent, this embodiment of the invention accomplishes the shift of the reaction rate differential to a favorable differential for resin curing by elevating the temperature of the system to a point at which the curing reaction rate is inherently greater than the surface reaction rate. This embodiment of the invention may be used with some caution, however, for while the polyester cure is greatly accelerated and the resin in the interfacial region is satisfactorily cured, it has been found that the overall properties of polyester resins cured under accelerated conditions may differ substantially from the properties of polyester resins cured under conventional conditions. Thus in some instances the end uses proposed for the resin/rubber body may preclude an accelerated cure of the resin.

What is claimed is:

1. A process for achieving full cure of a peroxide cured polyester resin body which is in contact on at least one surface with a surface of a rubber body, which comprises maintaining reaction conditions during curing such that the effective rate of the curing reaction of the polyester resin in the presence of a peroxide curing agent associated therewith is sufficiently faster than the effective rate of a competing reaction between said rubber surface and said peroxide curing agent that said polyester resin body becomes essentialy fully cured in the interfacial region adjacent to the contact interface between said surface of said resin and said surface of said rubber body wherein said conditions comprise utilizing as said rubber body an elastomeric material with an effective rate of surface reaction with said peroxide curing agent which is inherently slower than said effective rate of said polyester curing reaction under the reaction conditions prevailing.

2. A process as in claim 1 wherein said elastomeric material is a peroxide cured EPDM rubber.

3. A process for achieving full cure of a peroxide cured polyester resin body which is in contact on at least one surface with a surface of a rubber body, which comprises maintaining reaction conditions during curing such that the effective rate of the curing reaction of the polyester resin in the presence of a peroxide curing agent associated therewith is sufficiently faster than the effective rate of a competing reaction between said rubber surface and said peroxide curing agent that said polester resin body becomes essentially fully cured in the interfacial region adjacent to the contact interface between said surface of said resin and said surface of said rubber body wherein said conditions comprise incorporating an excess of peroxide material at the interface of said polyester resin body and said rubber body.

4. A process as in claim 3 wherein said peroxide material is the same type of peroxide as the peroxide curing agent.

5. A process as in claim 3 wherein said peroxide material is benzoyl peroxide.

6. A process for achieving full cure of a peroxide cured polyester resin body which is in contact on at least one surface with a surface of a rubber body, which comprises maintaining reaction conditions during curing such that the effective rate of the curing reaction of the polyester resin in the presence of a peroxide curing agent associated therewith is sufficiently faster than the effective rate of a competing reaction between said rubber surface and said peroxide curing agent that said polyester resin body becomes essentially fully cured in the interfacial region adjacent to the contact interface between said surface of said resin and said surface of said rubber body wherein said conditions comprise elevating the temperature of the system to a point where the effective curing reaction rate of the polyester resin is significantly greater than the effective reaction rate of the reaction between the rubber surface and the peroxide curing agent.

* * * * *